(12) United States Patent
Kusunoki

(10) Patent No.: US 10,168,470 B2
(45) Date of Patent: Jan. 1, 2019

(54) PLANAR LIGHTING DEVICE

(71) Applicant: MINEBEA CO., LTD., Kitasaku-gun, Nagano-ken (JP)

(72) Inventor: Ippei Kusunoki, Fukuroi (JP)

(73) Assignee: MINEBEA CO., LTD., Nagano (JP)

( * ) Notice: Subject to any disclaimer, the term of this patent is extended or adjusted under 35 U.S.C. 154(b) by 71 days.

(21) Appl. No.: 14/995,970

(22) Filed: Jan. 14, 2016

(65) Prior Publication Data

US 2016/0216438 A1  Jul. 28, 2016

(30) Foreign Application Priority Data

Jan. 28, 2015  (JP) .................................. 2015-014534

(51) Int. Cl.
    *F21V 8/00*  (2006.01)

(52) U.S. Cl.
    CPC .......... *G02B 6/0091* (2013.01); *G02B 6/0068* (2013.01)

(58) Field of Classification Search
    CPC .. G02B 6/0038; G02B 6/0053; G02B 6/0036; G02B 6/0028; G02B 6/0068; G02B 6/0055; G02B 6/0061
    USPC .................. 362/606, 610, 613, 615
    See application file for complete search history.

(56) References Cited

U.S. PATENT DOCUMENTS

| | | | | |
|---|---|---|---|---|
| 6,912,086 B2* | 6/2005 | Honda | ................... | G03B 21/22 348/787 |
| 7,083,317 B2 | 8/2006 | Higashiyama | | |
| 7,758,230 B2 | 7/2010 | Terada et al. | | |
| 8,118,465 B2* | 2/2012 | Kunimochi | .......... | G02B 6/0046 362/612 |
| 8,651,721 B2 | 2/2014 | Kunimochi | | |
| 8,894,264 B2* | 11/2014 | Takada | .................. | G02B 6/0088 362/606 |
| 8,931,943 B2* | 1/2015 | Kunimochi | .......... | G02B 6/0011 362/609 |
| 9,049,409 B2* | 6/2015 | Lee | ......................... | H04N 5/645 |
| 9,134,473 B2 | 9/2015 | Kawai | | |
| 9,158,056 B2* | 10/2015 | Takada | .................. | G02B 6/0068 |

(Continued)

FOREIGN PATENT DOCUMENTS

| CN | 1512242 A | 7/2004 |
|---|---|---|
| CN | 1241059 C | 2/2006 |

(Continued)

OTHER PUBLICATIONS

May 18, 2018 Office Action issued in Chinese Patent Application No. 201511030042.0.

(Continued)

*Primary Examiner* — Jong-Suk (James) Lee
*Assistant Examiner* — Mark Tsidulko
(74) *Attorney, Agent, or Firm* — Oliff PLC

(57) ABSTRACT

A planar lighting device includes: a plurality of point light sources; a circuit board provided with the point light sources; a light guide plate including an end surface along which the point light sources are disposed in a facing manner and a surface to which a portion of a front end of the circuit board is fixed; and a fixing member that fixes the circuit board to the light guide plate. The fixing member includes: a plurality of small-piece double-sided adhesive members; and a single-sided adhesive member that integrates the plurality of small-piece double-sided adhesive members.

9 Claims, 3 Drawing Sheets

(56) References Cited

U.S. PATENT DOCUMENTS

| | | | |
|---|---|---|---|
| 9,360,613 | B2 | 6/2016 | Sakai |
| 2013/0208502 | A1 | 8/2013 | Nakayama |

FOREIGN PATENT DOCUMENTS

| | | | |
|---|---|---|---|
| CN | 101329036 | A | 12/2008 |
| CN | 102859261 | A | 1/2013 |
| CN | 202813041 | U | 3/2013 |
| CN | 203131596 | U | 8/2013 |
| CN | 203980007 | U | 12/2014 |
| EP | 2814227 | A2 | 12/2014 |
| JP | 2005-259374 | A | 9/2005 |
| JP | 2007-059386 | A | 3/2007 |
| JP | 2013-254560 | A | 12/2013 |
| JP | 2014-215404 | A | 11/2014 |

OTHER PUBLICATIONS

Mar. 1, 2017 Office Action issued in Japanese Application No. 2015-014534.
Sep. 6, 2017 Office Action issued in Japanese Application No. 2015-014534.

* cited by examiner

PLANAR LIGHTING DEVICE

CROSS-REFERENCE TO RELATED APPLICATION(S)

The present application claims priority to and incorporates by reference the entire contents of Japanese Patent Application No. 2015-014534 filed in Japan on Jan. 28, 2015.

BACKGROUND OF THE INVENTION

1. Field of the Invention

The disclosure relates to a sidelight planar lighting device.

2. Description of the Related Art

Sidelight planar lighting devices (backlights) are widely used as lighting units for liquid-crystal display panels especially in the field of small mobile information apparatuses, such as mobile phones. Sidelight planar lighting devices each include small and environmentally compatible light-emitting diodes (LEDs) disposed along a side end surface of a light guide plate. In such planar lighting devices, the LEDs are generally mounted on a strip-like circuit board and disposed facing a light incident surface of the light guide plate. A front portion of the circuit board is fixed to a portion closer to the light incident surface on the light guide plate with an adhesive member, such as a double-sided tape, whereby the LEDs are disposed and fixed to the light guide plate (refer to Japanese Laid-open Patent Publication No. 2005-259374, for example).

Typically, the arrangement configuration of an adhesive member fixing a circuit board to a light guide plate has a limit in mounting and/or optical characteristics. It may possibly be necessary to dispose small pieces of the adhesive member independently and intermittently (in a manner separated from one another) in some cases. Especially in arrangement of a double-sided tape suitably used as an adhesive member on flexible printed circuits (FPC) suitably used as a circuit board in a planar lighting device, however, it is difficult to reliably and stably fix small pieces of the double-sided tape to the FPC in a manner separated from one another because of the following reasons 1) to 3).

1) The area of each small piece of the double-sided tape (that is, the adhesive area to the FPC) is too small to secure sufficient bonding strength to the FPC. 2) Because the FPC needs to be exposed to high temperature to mount LEDs on the FPC, the process of fixing the double-sided tape to the FPC needs to be performed after the LEDs are mounted on the FPC. This processing order may possibly result in reduced workability in the process of manually fixing the small pieces of the double-sided tape to the FPC, thereby making it difficult to stably fix them at uniform pressure. 3) The double-sided tape may possibly be hard to adhere depending on the material of a cover lay of the FPC or an adherend, such as a light reflection member and a light absorption member, provided on the cover lay.

The double-sided tape generally includes a protection member (hereinafter, referred to as a release liner) that protects adhesive layers on both the front and back surfaces when the double-sided tape is not used. To bond the FPC to the light guide plate with the double-sided tape, the release liner needs to be removed. If it is difficult, because of the reasons described above, to reliably and stably fix the small pieces of the double-sided tape to the FPC in a manner separated from one another, a part of the small pieces of the double-sided tape may possibly peel off the FPC when the release liner is removed after the double-sided tape is fixed onto the FPC. Typically, if at least one of the small pieces of the double-sided tape peels off the FPC, the FPC (that is, the LEDs) fails to be stably fixed to the light guide plate. This leads to reduction in the yield or complication of the process, such as a need for restoration.

To meet a recent demand for planar lighting devices having higher luminance, it is necessary to further increase the number of LEDs disposed along the light incident surface of the light guide plate. Consequently, the LEDs are designed to have a narrower pitch (that is, the gap between adjacent LEDs is made narrower), resulting in an increasing need for the adhesive members having an arrangement configuration separated from one another. As described above, to further increase the luminance of the planar lighting device by further increasing the number of LEDs, it is necessary to use adhesive members disposed in a manner separated from one another. The use of such adhesive members, however, makes it difficult to reliably and stably fix the FPC to the light guide plate.

SUMMARY OF THE INVENTION

It is an object of the disclosure to at least partially solve the problems in the conventional technology.

A planar lighting device includes: a plurality of point light sources; a circuit board provided with the point light sources; a light guide plate including an end surface along which the point light sources are disposed in a facing manner and a surface to which a portion of a front end of the circuit board is fixed; and a fixing member that fixes the circuit board to the light guide plate. The fixing member includes: a plurality of small-piece double-sided adhesive members; and a single-sided adhesive member that integrates the plurality of small-piece double-sided adhesive members.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Exemplary embodiments of a planar lighting device are described below in greater detail with reference to the accompanying drawings. The shape, the size, and other elements of components in the figures below are appropriately illustrated in an emphasized manner to facilitate understanding the disclosure.

Figure 1:
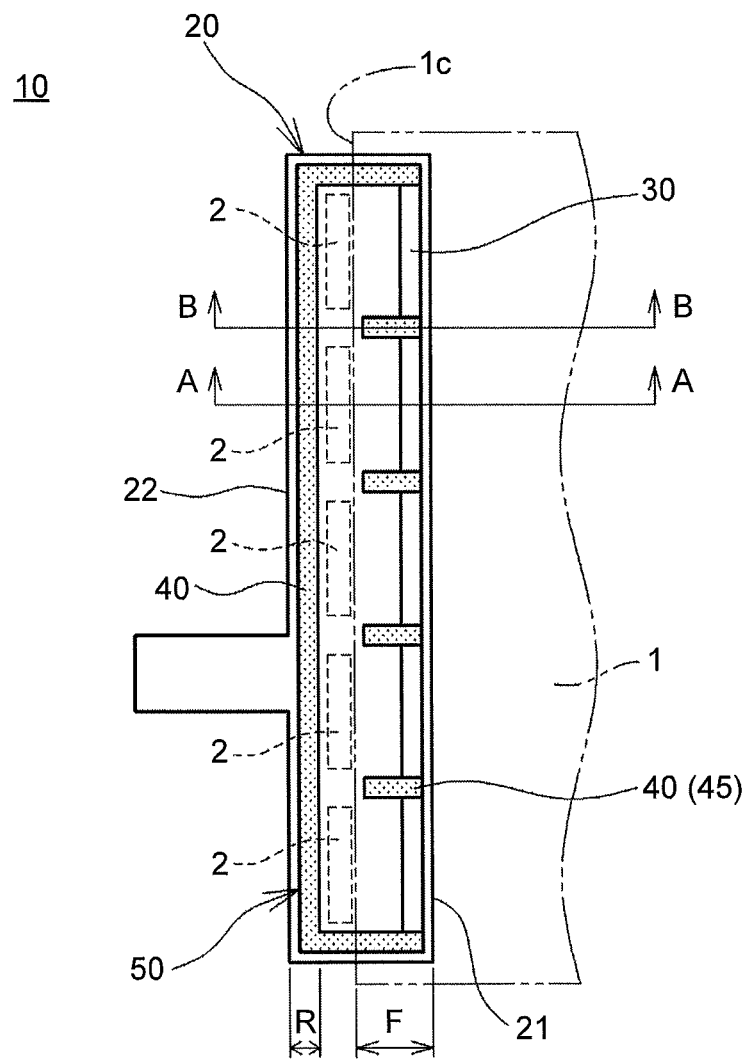
FIG. 1 is a plan view of a main part of a planar lighting device according to an embodiment of the disclosure.

As illustrated in FIGS. 1 and 2, a planar lighting device 10 includes a light guide plate 1, a plurality of (five, in the illustrated example) point light sources 2, and a circuit board 20 on which the point light sources 2 are mounted. To facilitate understanding the disclosure, the light guide plate 1 is indicated by the alternate long and two short dashes line, and the point light sources 2 are indicated by the broken lines in FIG. 1.

While the planar lighting device 10 further includes a frame-like housing frame 5 (refer to FIGS. 2A and 2B) that holds therein the planar lighting device 10 as an integrated unit, FIG. 1 does not illustrate the housing frame 5 to facilitate the understanding.

The point light sources 2 according to the present embodiment are pseudo-white light-emitting diodes (LEDs) each including a blue LED and a yellow fluorescent substance. The point light sources 2 are what is called side-view LEDs having a rectangular shape as a whole and having a light-emitting surface 3 (refer to FIG. 2) on one side surface. The circuit board 20 is composed of flexible printed circuits (FPC). In the following description of the configuration according to the present embodiment, the point light sources 2 are also referred to as LEDs 2, and the circuit board 20 is also referred to as an FPC 20.

The light guide plate 1 is made of a transparent material (e.g., a polycarbonate resin) and has a rectangular shape viewed from the top. The light guide plate 1 has a light incident surface 1c, a back surface 1b (refer to FIG. 2), and a light emission surface 1a (refer to FIG. 2) on the outer faces. The light incident surface 1c is an end surface along which the LEDs 2 are disposed in a facing manner. The back surface 1b is one of main planes extending nearly orthogonally to the light incident surface 1c and to which a portion of the FPC 20 on a front end 21 side is fixed, which will be described later. The light emission surface 1a is the other of the main planes facing the back surface 1b in parallel.

In this specification, "forward" denotes a direction from the light incident surface 1c of the light guide plate 1 to a facing end surface (not illustrated) (corresponding to a direction to which the light-emitting surface 3 of the LEDs 2 faces, that is, a light guiding direction). "Upward" denotes a direction from the back surface 1b to the light emission surface 1a. A left and right direction denotes a direction (longitudinal direction of the light incident surface 1c) orthogonal to the front-and-rear direction and the up-and-down direction (the "right side" and the "left side" are defined with respect to the front side when needed).

As illustrated in FIG. 2, the light guide plate 1 has a wedge portion 6 having a thickness gradually decreasing forward in an area closer to the light incident surface 1c. The light guide plate 1 also has, on the front side of the wedge portion 6, a light emission portion 7 that emits light emitted from the LEDs 2 and guided through the wedge portion 6 from the light emission surface 1a. The wedge portion 6 has an inclined surface 6a inclining at a constant angle such that it comes closer to the back surface 1b as it extends forward. The inclined surface 6a is formed on the light emission surface 1a along the longitudinal direction of the light incident surface 1c. The light emission portion 7 has a rectangular plate shape with a uniform thickness.

The planar lighting device 10 may include, on the back surface 1b side of the light guide plate 1, a reflection sheet (not illustrated) that returns light leaking from the back surface 1b to the light guide plate 1. Additionally/alternatively, the planar lighting device 10 may include, on the light emission surface 1a side of the light emission portion 7, a diffusion sheet and a prism sheet (not illustrated) that control the directivity of light emitted from the light emission surface 1a.

In the planar lighting device 10, a portion of the FPC 20 on the front end 21 side is fixed to the back surface 1b of the light guide plate 1 with a fixing member 50. A portion of the FPC 20 on a rear end 22 side is fixed to a back surface 5b of the housing frame 5 with the fixing member 50. The portion of the FPC 20 on the front end 21 side is a portion of a predetermined range from the front end 21 of the FPC 20 to the LEDs 2. In the present embodiment, the portion corresponds to a belt-like portion having a width indicated by the reference letter F in FIGS. 1 to 2B and extending in the longitudinal direction of the light incident surface 1c (hereinafter, the portion on the front end 21 side is denoted by the reference letter F). Similarly, the portion of the FPC 20 on the rear end 22 side is a portion of a predetermined range from the rear end 22 of the FPC 20 to the LEDs 2. In the present embodiment, the portion corresponds to a belt-like portion having a width indicated by the reference letter R in FIGS. 1 and 2 and extending in the longitudinal direction of the light incident surface 1c (hereinafter, the portion on the rear end 22 side is denoted by the reference letter R).

Figure 3:
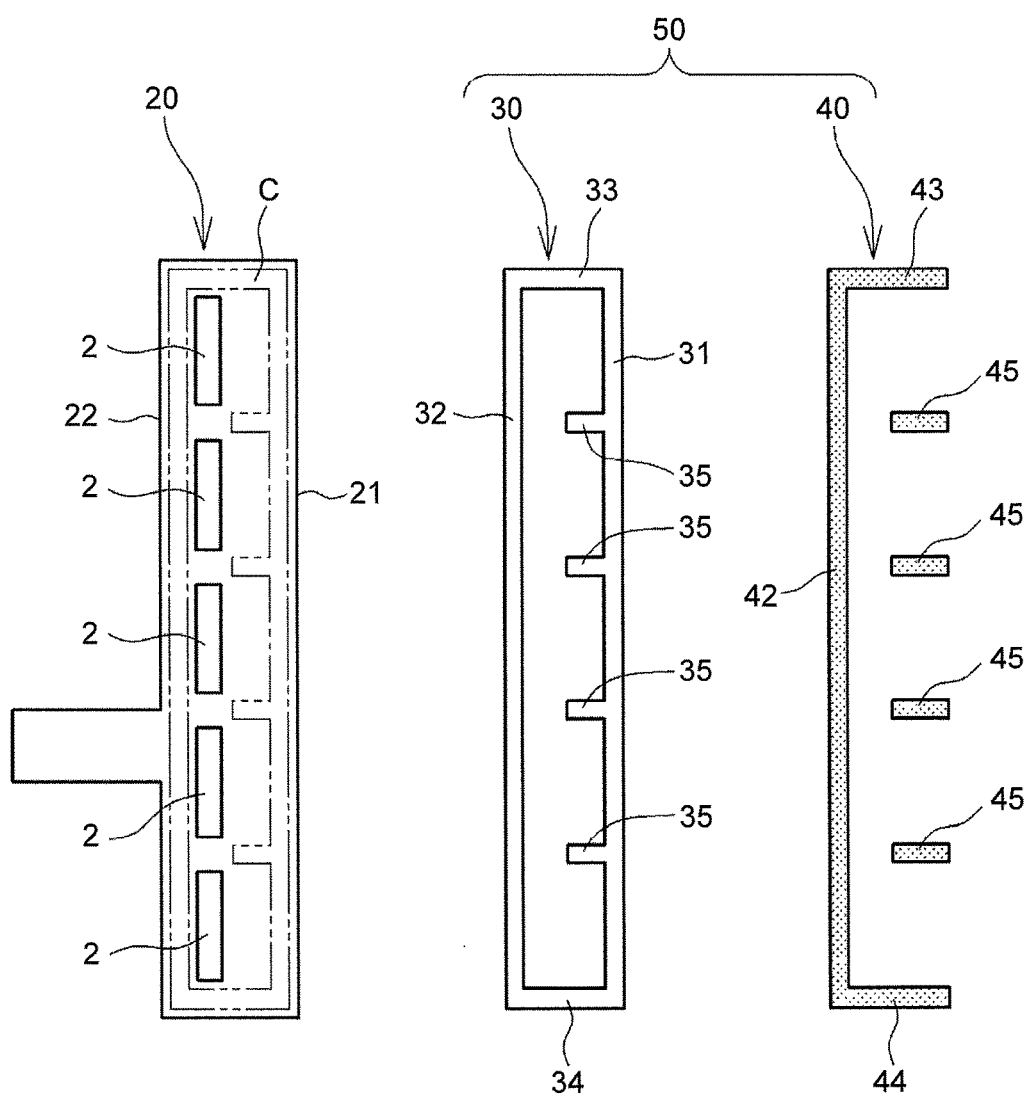
FIG. 3 is an exploded view of the planar lighting device illustrated in FIG. 1 into an FPC and a fixing member.

The fixing member 50 has a two-layer structure including a single-sided adhesive member 30 and a double-sided adhesive member 40. The single-sided adhesive member 30 serves as a first layer. The double-sided adhesive member 40 is fixed onto the single-sided adhesive member 30 and serves as a second layer. FIG. 3 illustrates the fixing member 50 in a manner divided into the single-sided adhesive member 30 and the double-sided adhesive member 40 and disposed side by side with the FPC 20 on which the LEDs 2 are mounted. FIG. 3 also illustrates the position to which the fixing member 50 is disposed and fixed on the FPC 20 as an area C surrounded by the alternate long and two short dashes line.

The single-sided adhesive member 30 according to the present embodiment is a single-sided tape obtained by applying an acrylic, silicon, or other element-based viscous agent to one side of a base material, such as a polyethylene terephthalate (PET) film. The surface on the viscous agent side serves as an adhesive surface, whereas the surface on the base material side serves as a non-adhesive surface. The double-sided adhesive member 40 according to the present embodiment is a double-sided tape obtained by applying an acrylic, silicon, or other element-based viscous agent to both surfaces of a base material, such as a PET film.

The fixing member 50 is obtained by adhesively fixing the double-sided adhesive member 40 onto the non-adhesive surface of the single-sided adhesive member 30 using a first adhesive surface of the double-sided adhesive member 40. The fixing member 50 is adhesively fixed to the FPC 20 using the adhesive surface of the single-sided adhesive member 30.

The FPC 20 is fixed to the light guide plate 1 by adhesively fixing a second adhesive surface of the double-sided adhesive member 40 on the side opposite to the side used for adhesion to the single-sided adhesive member 30 to the back surface 1b of the light guide plate 1. The double-sided adhesive member 40 is disposed at the portion of the FPC 20 on the front end 21 side (the configuration of which will be described later in detail). The FPC 20 according to the present embodiment is also fixed to the housing frame 5 by adhesively fixing the second adhesive surface of the double-sided adhesive member 40 on the side opposite to the side used for adhesion to the single-sided adhesive member 30 to the back surface 5b of the housing frame 5. The double-sided adhesive member 40 is disposed at the portion of the FPC 20 on the rear end 22 side (the configuration of which will be described later in detail).

FIG. 1 illustrates the FPC 20 to which the fixing member 50 is disposed and fixed viewed from the adhesive surface side of the double-sided adhesive member 40 (surface used for adhesion to the light guide plate 1 and the housing frame 5). In FIG. 1, the double-sided adhesive member 40 of the fixing member 50 is indicated by the small dot pattern.

As illustrated in FIG. 3, the single-sided adhesive member 30 has a front end side 31 and a rear end side 32. When the fixing member 50 is fixed to the predetermined position C on the FPC 20, the front end side 31 is disposed at the portion of the FPC 20 on the front end 21 side (that is, the front side of the LEDs 2) and extends along the longitudinal direction of the light incident surface 1c. The rear end side 32 is disposed at the portion of the FPC 20 on the rear end 22 side (that is, the rear side of the LEDs 2) facing the front end side 31 and extends along the longitudinal direction of the light incident surface 1c. The single-sided adhesive member 30 also has a pair of side end sides 33 and 34. The pair of side end sides 33 and 34 couples the front end side 31 and the rear end side 32 and is disposed on the outer side of the arrangement positions of the five LEDs 2 when the fixing member 50 is fixed to the predetermined position C on the FPC 20. The single-sided adhesive member 30 thus has a frame shape surrounding the arrangement positions of the five LEDs 2 as a whole.

The single-sided adhesive member 30 has a plurality of branch portions 35 extending rearward from the front end side 31. The branch portions 35 are disposed at positions between adjacent LEDs 2 when the fixing member 50 is disposed and fixed to the predetermined position C on the FPC 20. The length of the branch portions 35 in the front-and-rear direction is set such that the end of the branch portions 35 is included in the portion F of the FPC 20 on the front end 21 side when the fixing member 50 is disposed and fixed to the predetermined position C on the FPC 20. In other words, the branch portions 35 are disposed at respective portions on the front side of the areas between the adjacent LEDs 2. The planar lighting device 10 illustrated in the figures includes four branch portions 35 corresponding to the respective areas between the adjacent LEDs 2 for the arrangement configuration of the five LEDs 2 disposed in line.

The double-sided adhesive member 40 has a plurality of small-piece portions (small-piece double-sided adhesive members) 45 and portions 42, 43, and 44 having a U-shape as a whole. In the planar lighting device 10, the double-sided adhesive member 40 has four small-piece portions 45 corresponding to the four branch portions 35 of the single-sided adhesive member 30. The four small-piece portions 45 are adhesively fixed onto the non-adhesive surface of the respective branch portions 35 of the single-sided adhesive member 30. As a result, the four small-piece portions 45 of the double-sided adhesive member 40 are integrated by the single-sided adhesive member 30 in the fixing member 50.

In addition, the small-piece portions 45 are disposed at respective portions on the front side of the areas between the adjacent LEDs 2 when the fixing member 50 is disposed and fixed to the predetermined position C on the FPC 20.

The aspect in which the small-piece portions 45 of the double-sided adhesive member 40 are fixed to the branch portions 35 of the single-sided adhesive member 30 includes the case illustrated in FIG. 1: the small-piece portions 45 of the double-sided adhesive member 40 each have a portion extending forward to the range of the front end side 31 of the single-sided adhesive member 30 while having a width equal to (or smaller than) that of the respective branch portions 35 in the left-and-right direction.

The portions 42, 43, and 44 having a U-shape of the double-sided adhesive member 40 according to the present embodiment include a rear end side portion 42 and a pair of arm portions 43 and 44 extending forward from both ends of the rear end side portion 42. The rear end side portion 42 and the pair of arm portions 43 and 44 are adhesively fixed onto the non-adhesive surface of the rear end side 32 and the pair of side end sides 33 and 34, respectively, of the single-sided adhesive member 30. The single-sided adhesive member 30 according to the present embodiment thus integrates the entire double-sided adhesive member 40 including the portions 42, 43, and 44 having a U-shape.

Figure 2A:
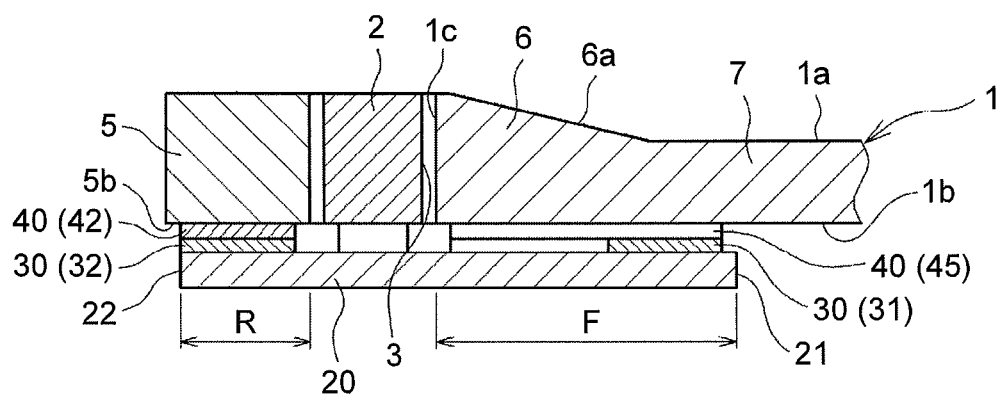
FIG. 2A is a sectional view of the planar lighting device with a housing frame along line A-A in FIG. 1.
Figure 2B:
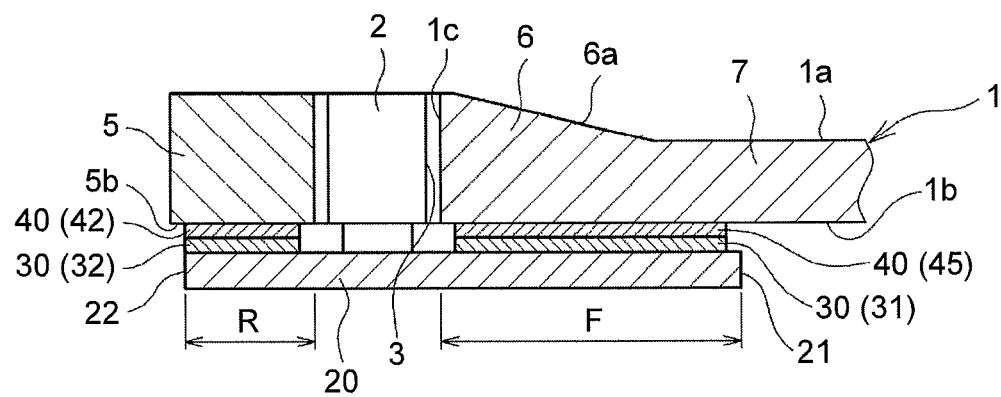
FIG. 2B is a sectional view of the planar lighting device with the housing frame along line B-B in FIG. 1.

In the fixing member 50, the portions disposed at the portion F of the FPC 20 on the front end 21 side and adhesively fixed to the back surface 1b of the light guide plate 1 correspond to the four small-piece portions 45 and the front part of the pair of arm portions 43 and 44 of the double-sided adhesive member 40. As a result, no double-sided adhesive member 40 is disposed at the portions on the front side of the LEDs 2 as illustrated in FIGS. 1 to 2B. In the fixing member 50, the portions disposed at the portion R of the FPC 20 on the rear end 22 side and adhesively fixed to the back surface 5b of the housing frame 5 correspond to the rear end side portion 42 and the rear part of the pair of arm portions 43 and 44 of the double-sided adhesive member 40. The pair of arm portions 43 and 44 is the double-sided adhesive member 40 positioned at areas on the side of the LEDs 2 positioned at both ends provided with no adjacent LED 2 out of the LEDs 2 disposed in line. The areas can typically have a larger width than that of the areas between the adjacent LEDs 2.

The following describes advantageous effects of the planar lighting device 10 having the configuration described above. In the planar lighting device 10, the fixing member 50 that fixes the FPC 20 to the light guide plate 1 includes the single-sided adhesive member 30 and the small-piece portions 45 of the double-sided adhesive member 40 integrated by the single-sided adhesive member 30. With this configuration, a large adhesive area can be secured in adhesion of the fixing member 50 to the FPC 20 by the adhesive surface of the single-sided adhesive member 30. In adhesion of the fixing member 50 to the light guide plate 1, adhesive areas can be provided in a manner separated from one another by the adhesive surfaces of the small-piece portions 45 of the double-sided adhesive member 40 integrated by the single-sided adhesive member 30. As a result, it is possible to provide the fixing member 50 having an arrangement configuration preferably employed in optical characteristics and to stably and reliably fix the FPC 20 to the light guide plate 1.

Even in a case where the number of LEDs 2 is increased by narrowing the array pitch of the LEDs 2, the configuration of the planar lighting device 10 makes it possible to provide the fixing member 50 having an arrangement configuration preferably employed in mounting on the FPC 20 and in optical characteristics and to stably and reliably fix the FPC 20 to the light guide plate with the fixing member 50. As a result, the present embodiment can be attributed to an increase in the luminance of the planar lighting device 10 based on an increase in the number of LEDs 2.

More specifically, the small-piece portions 45 of the double-sided adhesive member 40 are disposed at the respective areas between the adjacent LEDs 2 in the planar lighting device 10. As a result, the double-sided adhesive member 40 can be disposed in a manner separated from one another without being disposed at the portions on the front side of the LEDs 2 (in the light emission direction) (that is, at areas other than the portions on the front side of the LEDs 2). This configuration provides the following advantageous effects.

Let us assume a case where the double-sided adhesive member 40 is disposed at the portions on the front side of the LEDs 2, and the interface between the outer surface (back surface 1b, in this case) of the light guide plate 1 and the adhesive layer (an adhesive or a viscous agent) of the double-sided adhesive member 40 is present at the portions on the front side of the LEDs 2. In this case, most of light emitted to the front side of the LEDs 2 and reaching the interface enters into the adhesive layer as transmitted light, whereby light reflected by the interface and traveling into the light guide plate 1 is reduced. As a result, the luminance of the planar lighting device 10 is reduced.

To address this, the planar lighting device 10 has a configuration in which the double-sided adhesive member 40 is disposed in a manner separated from one another without being disposed at the portions on the front side of the LEDs 2. As a result, an air layer alone is present between the back surface 1b of the light guide plate 1 and the single-sided adhesive member 30 of the fixing member 50 on the front side of the LEDs 2 as illustrated in FIG. 2A, for example. The light emitted to the front side of the LEDs 2 and reaching the back surface 1b of the light guide plate 1 is guided into the light guide plate 1 by normal reflection on the interface between the light guide plate 1 and the air. As described above, the planar lighting device 10 includes the fixing member 50 having an arrangement configuration preferably employed in optical characteristics that prevents light emitted from the LEDs 2 and entering into the light guide plate 1 from passing through the fixing member 50. It is thus possible to increase the luminance of the planar lighting device 10.

In the planar lighting device 10, the small-piece portions 45 of the double-sided adhesive member 40 are disposed at the respective portions on the front side of the areas between the adjacent LEDs 2. As a result, the double-sided adhesive member 40 can be disposed in a manner separated from one another without being disposed at the portions on the front side of the LEDs 2 or the portions on the side of the LEDs 2. Even if a sufficient space fails to be secured to which the double-sided adhesive member 40 is disposed and fixed at the portions on the side of the LEDs 2 on the FPC 20 because the array pitch of the LEDs 2 is made narrower to increase the number of LEDs 2, the present embodiment can provide the fixing member 50 having an arrangement configuration preferably employed in optical characteristics and in mounting on the FPC 20 as described above. It is thus possible to further increase the luminance of the planar lighting device 10.

The portions on the front side of the LEDs 2 (also the portions on the front side of the areas between the adjacent LEDs 2) are determined depending on conditions, such as the directional characteristics of light emitted from the LEDs 2, permissible loss of light, and the bonding strength between the FPC 20 and the light guide plate 1. The portions on the front side of the LEDs 2 do not necessarily extend forward having a width corresponding to the total length of the external form of the respective LEDs 2 in the left-and-right direction. The width of the small-piece portions 45 (and the parts of the arm portions 43 and 44 closer to the front side than the LEDs 2) of the double-sided adhesive member 40 in the left-and-right direction and the gaps between adjacent small-piece portions 45 (and the gaps between the arm portions 43 and 44 and respective adjacent small-piece portions 45) are appropriately set considering the conditions described above. Therefore, the small-piece portions 45 (and the parts of the arm portions 43 and 44 closer to the front side than the LEDs 2) of the double-sided adhesive member 40 may have a part overlapping with a part of the LEDs 2 viewed in the front-and-rear direction.

It is difficult for the conventional fixing member composed of a double-sided adhesive member alone to provide the fixing member 50 having an arrangement configuration preferably employed in optical characteristics and/or mounting as described above and to stably and reliably fix the FPC 20 to the light guide plate 1. To address the problem described above, the planar lighting device 10 includes the fixing member 50 having a plurality of small-piece double-sided adhesive members (small-piece portions 45) integrated by the single-sided adhesive member 30 to fix the FPC 20 to the light guide plate 1.

In the planar lighting device 10, the single-sided adhesive member 30 is a single-sided tape, the double-sided adhesive member 40 is a double-sided tape, and the fixing member 50 has a two-layer structure obtained by adhesively fixing the double-sided tape (hereinafter, denoted by a reference numeral 40) onto a non-adhesive surface of the single-sided tape (hereinafter, denoted by a reference numeral 30). The planar lighting device 10 provides the following advantageous effects.

Because the fixing member 50 having the configuration described above can be produced in advance in a separate process before being fixed to the FPC 20, the fixing member 50 is easy to produce. By employing a method of adhesively fixing the double-sided tape 40 to the sheet-like single-sided tape 30 and cutting the integrated tape into a predetermined shape as the method for producing the fixing member 50, it is possible to produce the fixing member 50 with high mass-productivity. In addition, the process of disposing and fixing the fixing member 50 pre-produced in this manner onto the FPC 20 is performed with much higher workability than the process of disposing and fixing the small-piece double-sided tapes 40 directly onto the FPC.

In the process of producing the fixing member 50, the small-piece portions 45 of the double-sided tape 40 can be adhesively fixed onto the non-adhesive surface of the single-sided tape 30 with a predetermined pressure mechanically applied. As a result, the small-piece portions 45 of the double-sided tape 40 can be reliably and uniformly fixed onto the single-sided tape 30. When the fixing member 50 is disposed and fixed onto the FPC 20, and the release liner of the double-sided tape 40 is removed to fix the FPC 20 to the light guide plate 1, the small-piece portions 45 are prevented from peeling off the single-sided tape 30. Furthermore, after the fixing member 50 is bonded to the light guide plate 1 with the double-sided tape 40, the small-piece portions 45 of the double-sided tape 40 are prevented from peeling off the single-sided tape 30.

Because the fixing member 50 is bonded to the FPC 20 using the adhesive surface of the single-sided tape 30, the adhesive area between the FPC 20 and the fixing member 50 can be increased compared with the case where the small-piece portions 45 of the double-sided tape 40 are directly bonded to the FPC 20. As a result, the fixing member 50 is prevented from peeling off the FPC 20.

As described above, the fixing member 50 according to the present embodiment can stably and reliably fix the FPC 20 to the light guide plate 1. In addition, the use of the fixing member 50 can improve the work efficiency and increase the yield in the manufacturing process of the device compared with the planar lighting device including the conventional fixing member composed of the double-sided tape 40 alone (small-piece double-sided tapes separated from one another).

In the planar lighting device 10, the single-sided adhesive member 30 of the fixing member 50 has the front end side 31 and the branch portions 35 extending rearward from the front end side 31. The small-piece portions 45 of the double-sided adhesive member 40 are fixed to the respective branch portions 35. This configuration can facilitate providing the fixing member 50 having the following arrangement configuration: the small-piece portions 45 of the double-sided adhesive member 40 are integrated by the single-sided adhesive member 30 and are disposed in a manner separated from one another between the adjacent LEDs 2 (especially on the front side thereof).

In the planar lighting device 10, the single-sided adhesive member 30 has the rear end side 32 facing the front end side 31. Because the rear end side 32 is positioned on the rear side of the LEDs 2, it can increase the adhesive area between the fixing member 50 and the FPC 20 without affecting the light emitted from the LEDs 2. This configuration makes it possible to more reliably and stably fix the fixing member 50 to the FPC 20.

In the planar lighting device 10, the rear end side 32 of the single-sided adhesive member 30 is fixed to the housing frame 5 with the rear end side portion 42 of the double-sided adhesive member 40 interposed therebetween. This configuration makes it possible to more reliably and stably bond the FPC 20 to the planar lighting device 10.

In the planar lighting device 10, the single-sided adhesive member 30 has the pair of side end sides 33 and 34 coupling the front end side 31 to the rear end side 32 and has a frame shape as a whole. This configuration can increase the structural strength of the fixing member 50 and the workability in the process of fixing the fixing member 50 to the FPC 20.

While the explanation has been made of an exemplary embodiment, the embodiment is not intended to limit the disclosure. In the planar lighting device, for example, the FPC 20 may be fixed only to the light guide plate 1. In this case, the rear end side portion 42 and a part of the pair of arms 43 and 44 not included in the portion F of the FPC 20 on the front end 21 side are not required out of the portions 42, 43, and 44 having a U-shape of the double-sided adhesive member 40. Furthermore, small-piece portions of the double-sided adhesive member 40 corresponding to the front part of the pair of arms 43 and 44 may be disposed on the diagonally front right side (side provided with no adjacent LED 2) of the LED 2 positioned at the rightmost end and on the diagonally front left side (side provided with no adjacent LED 2) of the LED 2 positioned at the leftmost end out of the LEDs 2. Even in a case where the double-sided adhesive member 40 has the rear end side portion 42, the portions corresponding to the front part of the pair of arms 43 and 44 may be small-piece portions not coupled to the rear end side portion 42.

In the planar lighting device, the fixing member 50 may include the single-sided adhesive member 30 and the double-sided adhesive member 40 disposed on the side of the LEDs 2 in the areas between the adjacent LEDs 2. In this case, because the adhesive area between the fixing member 50 and the light guide plate 1 is further increased, it is possible to more reliably and stably bond the FPC 20 to the planar lighting device 10.

In the planar lighting device, the FPC 20 may be fixed to the light emission surface 1a side of the light guide plate 1. To fix the FPC 20 to the light emission surface 1a side of the light guide plate 1 having the wedge portion 6 like the light guide plate 1, a support used to fix the FPC 20 to the wedge portion 6 may be provided, and the FPC 20 may be fixed onto the support.

In the planar lighting device, the shape of the small-piece portions 45 of the double-sided adhesive member 40 is not necessarily a rectangle in plan view. The small-piece portions 45, for example, may have a tapered shape to prevent the light emitted from the LEDs 2 from reaching them depending on the spread of the emitted light.

In the planar lighting device, the double-sided adhesive member 40 does not necessarily have a structure obtained by applying a viscous agent to both surfaces of a base material like a double-sided tape as long as both surfaces can serve as adhesive surfaces. The double-sided adhesive member 40, for example, may be made of a viscous agent alone with no base material.

In the planar lighting device, the shape of the single-sided adhesive member 30 is not limited to a frame shape. The single-sided adhesive member 30, for example, may have a comb shape as a whole not including the rear end side 32 but including the front end side 31 and the branch portions 35 extending from the front end side 31 (including branch portions extending from both ends of the front end side 31 corresponding to the front part of the pair of side end sides 33 and 34 as needed). In this case, the double-sided adhesive member 40 is composed mainly of the small-piece portions 45 fixed onto the respective branch portions 35 (and, in a case where the single-sided adhesive member 30 has the branch portions extending from both ends of the front end side 31, and the double-sided adhesive member 40 is fixed onto the branch portions, small-piece portions corresponding thereto). Alternatively, the single-sided adhesive member 30 may have a shape not including the front end side 31 but including the rear end side 32 and a plurality of branch portions extending forward from the rear end side 32 (including branch portions extending from both ends of the rear end side 32 corresponding to the rear part of the pair of side end sides 33 and 34 as needed). In this case, the double-sided adhesive member 40 is composed mainly of small-piece portions fixed onto the respective branch portions extending from the rear end side 32 (and, in a case where the single-sided adhesive member 30 has the branch portions extending from both ends of the rear end side 32, and the double-sided adhesive member 40 is fixed onto the branch portions, small-piece portions corresponding thereto).

In the planar lighting device, the single-sided adhesive member 30 may have a shape including any one or neither of the pair of side end sides 33 and 34.

The term "adhesion" in this specification not only indicates an aspect of integration of adherends carried out by hardening an adhesive by drying, a chemical change, a temperature change, and other causes after joining the adherends but also has a broader meaning including what is called "viscosity" (pressure-sensitive adhesion) that causes integration of the adherends without hardening the adhesive.

The small-piece double-sided adhesive members may be disposed between the point light sources adjacent to each other. In other words, the double-sided adhesive members may not be disposed at the portions on the front side of the point light sources, and disposed at areas other than the portions on the front side. This arrangement makes it possible to provide the fixing member having an arrangement configuration preferably employed in optical characteristics that prevents light emitted from the point light sources and entering into the light guide plate from passing through the fixing member. It is thus possible to increase the luminance of the planar lighting device.

The areas "between the point light sources adjacent to each other" in this specification include not only the portions on the side of the point light sources but also portions (on the front side) including portions extending forward from the portions on the side of the point light sources and portions (on the rear side) including portions extending rearward from the portions on the side of the point light sources. Therefore, the term "portions on the front side of the areas between the point light sources adjacent to each other" in this specification, for example, does not indicate the portions closer to the front side than the areas between the point light sources adjacent to each other. The term indicates the portions on the front side out of the portions on the side of the point light sources corresponding to the areas between the point light sources adjacent to each other, the portions on the front side thereof, and the portions on the rear side thereof.

Moreover, the small-piece double-sided adhesive members may be disposed at the portions on the front side of the areas between the point light sources adjacent to each other. This arrangement makes it possible to provide the fixing member having an arrangement configuration preferably employed in optical characteristics that prevents light emitted from the point light sources and entering into the light guide plate from passing through the fixing member. Especially in a case where the gap (array pitch) between the point light sources adjacent to each other is small, this arrangement makes it possible to provide the fixing member having an arrangement configuration preferably employed in mounting in which no double-sided adhesive member is disposed at the portions on the side of the point light sources on the circuit board (especially at the portions on the side of the point light sources adjacent to each other). It is thus possible to stably and reliably fix the circuit board to the light guide plate.

The small-piece double-sided adhesive members are disposed at the portions on the front side of the areas between the point light sources adjacent to each other. The portions may include the portions extending forward from the portions on the side of the point light sources. The portions may also include portions spreading toward adjacent point light sources from the portions extending forward from the portions on the side of the point light sources depending on the directional characteristics of light emitted from the point light sources, permissible loss of light, the bonding strength between the circuit board and the light guide plate, and other factors. Therefore, the small-piece double-sided adhesive members disposed at the portions on the front side of the areas between the point light sources adjacent to each other may have a part overlapping with a part of the point light sources viewed in the front-and-rear direction.

In the planar lighting device, the single-sided adhesive member may have the front end side and the branch portions extending rearward from the front end side, and the small-piece double-sided adhesive members are fixed to the respective branch portions. This configuration can facilitate providing the fixing member having an arrangement configuration in which the small-piece double-sided adhesive members are integrated by the single-sided adhesive member and are disposed in a manner separated from one another between the point light sources adjacent to each other (especially at the portions on the front side thereof).

In the planar lighting device, the single-sided adhesive member may have the rear end side facing the front end side, and the rear end side may be positioned on the rear side of the point light sources. This configuration can increase the adhesive area between the fixing member and the circuit board without affecting the light emitted from the point light sources. It is thus possible to more reliably and stably fix the fixing member to the circuit board.

The planar lighting device may include the housing frame. It is thus possible to more reliably and stably bond the circuit board to the device.

The planar lighting device can provide higher structural strength of the fixing member and higher workability in the process of fixing the fixing member to the circuit board.

The configuration described above meets demands in mounting and/or optical characteristics for an arrangement configuration of the fixing member that fixes the circuit board provided with the point light sources to the light guide plate. It is thus possible to stably and reliably fix the circuit board to the light guide plate. Even if the number of point light sources is increased by narrowing the array pitch of the point light sources, the disclosure makes it possible to stably and reliably fix the circuit board to the light guide plate with the fixing member. As a result, the disclosure can be attributed to an increase in the luminance of the planar lighting device based on an increase in the number of point light sources.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar lighting device comprising:
   a plurality of point light sources;
   a circuit board provided with the point light sources;
   a light guide plate including an end surface along which the point light sources are disposed in a facing manner and a surface to which a portion of a front end of the circuit board is fixed; and
   a fixing member that fixes the circuit board to the light guide plate, the fixing member having a two-layer structure formed by a plurality of small-piece double-sided adhesive members and a single-sided adhesive member, wherein:
   the single-sided adhesive member corresponds to a first layer of the two-layer structure, and the plurality of small-piece double-sided adhesive members correspond to a second layer of the two-layer structure;
   the single-sided adhesive member
      is configured to integrally support the small-piece double-sided adhesive members arranged in a manner separated from one another and adhesively fixed on the single-sided adhesive member, and
      includes a front end side disposed at the portion of the front end of the circuit board, and a plurality of branch portions extending from the front end side in a direction from a first end surface toward a second end surface of the light guide plate, the first end surface being an end surface opposite to the second end surface, the second end surface being the end surface along which the point light sources are disposed in a facing manner;
   an adhesive surface of the single-sided adhesive member is adhesively fixed to the circuit board;
   a first adhesive surface of each of the small-piece double-sided adhesive members is adhesively fixed to a non-adhesive surface of a respective branch portion of the single-sided adhesive member; and a second adhesive surface of each of the small-piece double-sided adhesive members is adhesively fixed to the light guide plate.

2. The planar lighting device according to claim 1, wherein
the small-piece double-sided adhesive members are disposed between the point light sources adjacent to each other.

3. The planar lighting device according to claim 2, wherein
the small-piece double-sided adhesive members are disposed at portions on a front side of areas between the point light sources adjacent to each other.

4. The planar lighting device according to claim 1, wherein:
the single-sided adhesive member includes a rear end side facing the front end side; and
the rear end side of the single-sided adhesive member is positioned on a rear side of the point light sources.

5. The planar lighting device according to claim 4, further comprising
a housing frame to which the rear end side of the single-sided adhesive member is fixed.

6. The planar lighting device according to claim 4, wherein
the single-sided adhesive member includes a pair of side end sides coupling the front end side to the rear end side to form a frame shape as a whole.

7. The planar lighting device according to claim 1, wherein
positions of the small-piece double-sided adhesive members on the light guide plate are determined by adhesively fixing the adhesive surface of the single-sided adhesive member to a predetermined position on the circuit board.

8. The planar lighting device according to claim 1, wherein
the small-piece double-sided adhesive members are disposed so as to form a space between the circuit board and the light guide plate on a front side of each of the point light sources.

9. A planar lighting device comprising:
a plurality of point light sources;
a circuit board provided with the point light sources;
a light guide plate including an end surface along which the point light sources are disposed in a facing manner and a surface to which a portion of a front end of the circuit board is fixed; and
a fixing member that fixes the circuit board to the light guide plate, the fixing member including:
a plurality of small-piece double-sided adhesive members; and
a single-sided adhesive member, wherein:
an adhesive surface of the single-sided adhesive member is adhesively fixed to the circuit board;
the small-piece double-sided adhesive members are arranged on the single-sided adhesive member in a manner separated from one another;
the single-sided adhesive member includes a front end side and a plurality of branch portions extending from the front end side in a direction from a first end surface toward a second end surface of the light guide plate, the first end surface being an end surface opposite to the second end surface, the second end surface being the end surface along which the point light sources are disposed in a facing manner;
a first adhesive surface of each of the small-piece double-sided adhesive members is adhesively fixed to a non-adhesive surface of a respective branch portion of the single-sided adhesive member; and
a second adhesive surface of each of the small-piece double-sided adhesive members is adhesively fixed to the light guide plate.

\* \* \* \* \*